United States Patent
Richards, Jr.

[11] Patent Number: 6,135,138
[45] Date of Patent: Oct. 24, 2000

[54] ROTARY COUPLER FOR FLUID CONDUITS

[75] Inventor: Chester L. Richards, Jr., Thousand Oaks, Calif.

[73] Assignee: Raytheon Company, Lexington, Mass.

[21] Appl. No.: 09/495,108

[22] Filed: Feb. 1, 2000

[51] Int. Cl.⁷ .............................. F16L 27/00; F16L 55/02
[52] U.S. Cl. .......................... 137/312; 137/580; 138/113; 138/114
[58] Field of Search .................... 137/580, 312, 137/565.23; 138/113, 114

[56] References Cited

U.S. PATENT DOCUMENTS

| | | | |
|---|---|---|---|
| Re. 34,923 | 5/1995 | Ruesch | 137/15 |
| 4,836,237 | 6/1989 | McCullough | 137/312 |
| 5,052,436 | 10/1991 | Bauch et al. | 137/580 |
| 5,884,657 | 3/1999 | Srock | 137/312 |
| 5,931,184 | 8/1999 | Armenia et al. | 137/312 |

FOREIGN PATENT DOCUMENTS 2408406  8/1974  Germany ................................ 137/312

*Primary Examiner*—A. Michael Chambers
*Attorney, Agent, or Firm*—Colin M. Raufer; Leonard A. Alkov; Glenn H. Lenzen, Jr.

[57] ABSTRACT

A rotary fluid coupler includes a first fluid conduit, a second fluid conduit in fluid communication with the first fluid conduit and rotatable relative to the first fluid conduit, and a first fluid conduit/second fluid conduit seal at a joint between the first fluid conduit and the second fluid conduit. A return fluid conduit has an inlet end that receives fluid leaked through the first fluid conduit/second fluid conduit seal, and a return/joint seal that seals against leakage from the return fluid conduit to an external environment. A fluid-pressure biasing source is in communication with the return fluid conduit to move fluid away from the inlet end through the return fluid conduit, and back to a fluid source.

18 Claims, 3 Drawing Sheets

ROTARY COUPLER FOR FLUID CONDUITS

BACKGROUND OF THE INVENTION

This invention relates to a coupler for fluid conduits that permits the rotary motion of the conduits relative to each other, and, more particularly, to such a coupler operable in a high-vacuum external environment.

It often is necessary to couple fluid conduits in a manner which permits the conduits to rotate relative to each other. An example is a cooling conduit in a rotatable sensor assembly. A flow of a liquid coolant flows from a source, through a conduit, and to a sensor mounted on a rotatable gimbal. The conduit must be rotatable to permit the gimbal to rotate.

At the present time, there are two techniques for achieving rotation in the conduit. In one, there is a joint with O-ring seals located along the length of the conduit. While operable, this approach has the shortcoming that there may be significant leakage of liquid or gas through the seal. The leakage may be particularly troublesome when the structure is operated in a high-vacuum environment such as in space. The external vacuum environment accelerates the leakage through the seal. The loss of liquid or gas may limit the life of the system due to exhaustion of the coolant, and the lost gas may adversely affect the operation of other parts of the spacecraft.

The other approach is to use a coiled tube, having no joints along its length, to convey the coolant. The tube coils and uncoils as the gimbal rotates. This conduit structure avoids leakage, but it limits the rotation of the gimbal to up to about 1½ revolutions in either direction. This limitation on the amount of rotation may rule out this option for some applications, such as sensor systems which must track multiple objects at the same time. The conduit also adds uncontrolled drag to the rotation of the gimbal, which may adversely affect the tracking precision of the gimbaled sensor.

Thus, while operable conduit structures are known, they all have shortcomings, particularly in a vacuum environment. There is a need for an improved technique for coupling a fluid conduit to a rotatable structure. The present invention fulfills this need, and further provides related advantages.

SUMMARY OF THE INVENTION

The present invention provides a rotary coupler for fluid conduits, which connects two fluid conduits that rotate relative to each other. The rotary coupler achieves a connection that permits unlimited rotations in either direction. Essentially no fluid is lost from the rotary connection by leakage through the seals. The rotary coupler is therefore ideal for use in a vacuum environment, such as that of space.

In accordance with the invention, a rotary fluid coupler comprises a first fluid conduit, and a second fluid conduit in fluid communication with the first fluid conduit and rotatable relative to the first fluid conduit. The coupler further includes a first fluid conduit/second fluid conduit seal at a joint between the first fluid conduit and the second fluid conduit. The first fluid conduit/second fluid conduit seal seals against loss of fluid from the joint between the first fluid conduit and the second fluid conduit. A return fluid conduit has an inlet end disposed to receive fluid leaked through the first fluid conduct/second fluid conduit seal. Preferably, the return fluid conduit is concentric about the first fluid conduit so that fluid may flow in a return annulus therebetween. A return/joint seal at the inlet end of the return fluid conduit seals against loss of fluid from the inlet end of the return fluid conduit to an external environment. A fluid-pressure biasing source in communication with the return fluid conduit moves fluid away from the inlet end through the return fluid conduit.

In a typical case, the first fluid conduit is relatively stationary, and the second fluid conduit rotates. Each of the seals preferably comprises an O-ring seal. In an application of particular interest to the inventor, the first fluid conduit is a liquid-source fluid conduit and the second fluid conduit is a liquid-sink fluid conduit.

In one embodiment, the rotary fluid coupler further includes a third fluid conduit, and a fourth fluid conduit in fluid communication with the third fluid conduit and overlying the second fluid conduit so that fluid may flow in a fourth-fluid conduit annulus between the second fluid conduit and the fourth fluid conduit. A third fluid conduit/fourth fluid conduit seal at a second joint between the third fluid conduit and the fourth fluid conduit seals against loss of fluid from the second joint to the return fluid conduit. The inlet end of the return fluid conduit is positioned to receive any fluid leaked through the third fluid conduit/fourth fluid conduit seal.

In one application of this embodiment having a third fluid conduit and a fourth fluid conduit, the first fluid conduit and the second fluid conduit carry a liquefied coolant from its source to a structure to be cooled, such as a sensor structure. The third fluid conduit and the fourth fluid conduit carry evaporated liquid—the coolant in its gaseous form—back to the source from the structure being cooled. The rotary fluid coupler provides a single rotatable fluid coupling for both pairs of conduits. The return fluid conduit captures fluid leaking through the third fluid conduit/fourth fluid conduit seal, and returns it to the source for condensation, if necessary, and reuse.

The present approach provides a rotary fluid coupler that accomplishes rotary coupling without limitation on the number of revolutions and without imposing a substantial amount of drag on the rotation, and also prevents leakage of fluid from the rotary coupler in service. The rotary coupler is therefore particularly useful in a system that must remain operable for long periods of time without exhausting the fluid. It is also useful in a vacuum environment, where the loss of fluid may adversely affect the cleanliness of the system. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
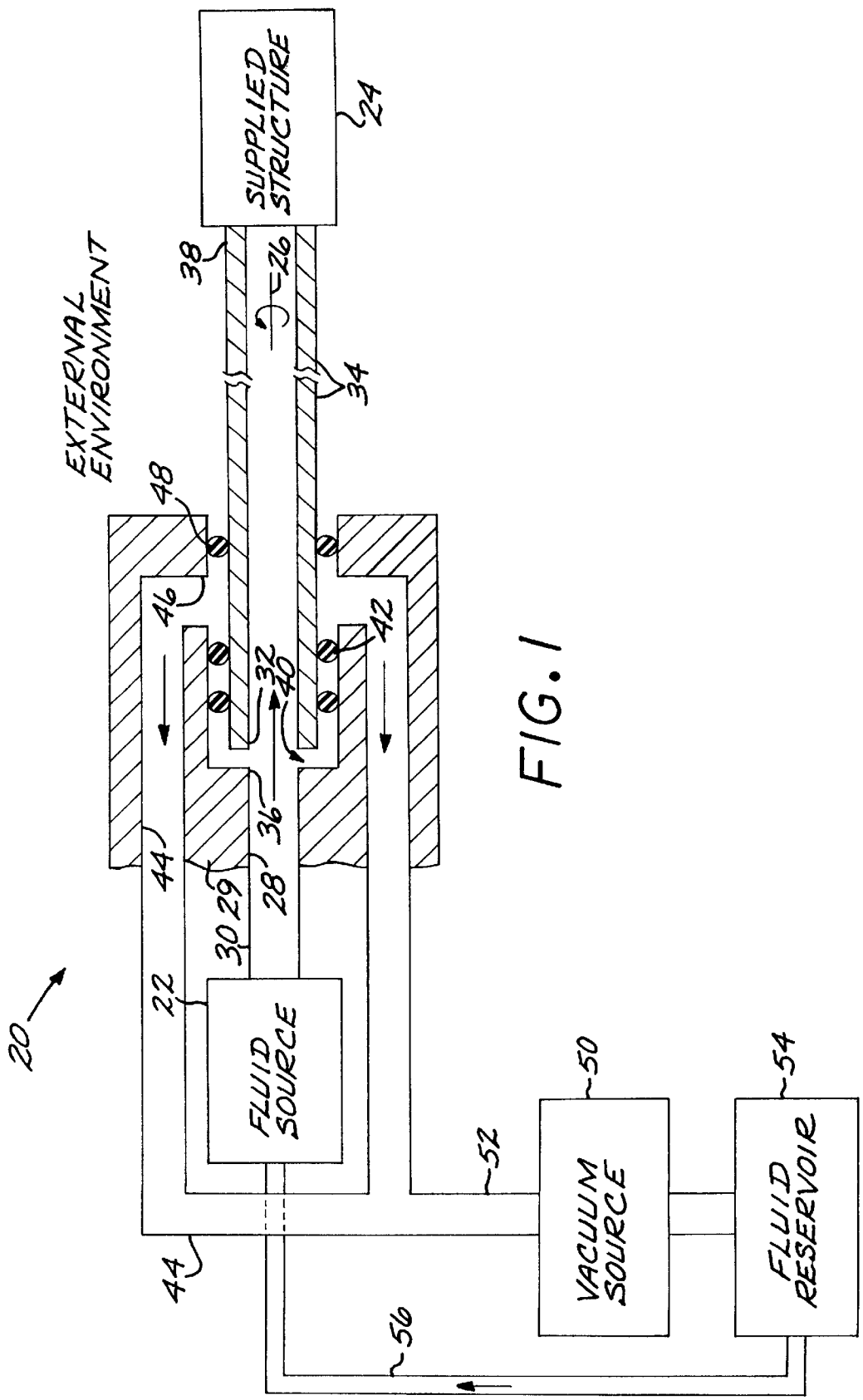
FIG. 1 is a schematic sectional view of a first embodiment of a rotary fluid coupler.

FIG. 1 depicts a rotary fluid coupler 20 that conveys fluid from a fluid source 22 to a supplied structure 24. In the drawings, arrows within conduits indicate directions of fluid flow. The rotary fluid coupler 20 is bidirectional, and the fluid could flow in the opposite direction if desired. The embodiments depicted herein are preferred. As used herein, the term "fluid" includes both a liquid and a gas, but does not include a solid. The supplied structure 24 is rotatable relative to the fluid source 22, about an axis of rotation 26.

In an application of particular interest, the fluid is a cryogenic liquid such as liquid nitrogen, the fluid source 22 is a source of the cryogenic liquid, and the supplied structure 24 is a device to be cooled, such as a sensor assembly that is to be cooled to about the temperature of liquid nitrogen, 77 K. The entire system of rotary coupler 20, fluid source 22, and supplied structure 24 is in an environmental vacuum. The use of the present invention is not limited to this preferred application, however.

The rotary fluid coupler 20 includes a first fluid conduit 28, which in the illustration of FIG. 1 is a channel in a housing 29. A first end 30 of the first fluid conduit 28 is in fluid communication with the fluid source 22 and thus serves as a liquid-source fluid conduit. The term "conduit" is used in its conventional sense herein, meaning a pipe, tube, channel, or the like for conveying a fluid. A first end 32 of a second fluid conduit 34 is in fluid communication with a second end 36 of the first fluid conduit 28. In the illustration of FIG. 1, the second fluid conduit 34 is a tube. A second end 38 of the second fluid conduit 34 is in fluid communication with the supplied structure 24. The second end 36 of the first fluid conduit 28 meets the first end 32 of the second fluid conduit 34 at a joint 40. The second fluid conduit 34 rotates about the axis of rotation 26 relative to the first fluid conduit 28. In this case, the first fluid conduit 28 is illustrated as stationary and the second fluid conduit 34 is illustrated as rotating.

There is a first fluid conduit/second fluid conduit seal 42 at the joint 40 between the first fluid conduit 28 and the second fluid conduit 34. This first fluid conduit/second fluid conduit seal 42 preferably comprises at least one O-ring seal around the outer circumference of the second fluid conduit 34, and preferably several O-ring seals in series (two are illustrated). This first fluid conduit/second fluid conduit seal 42 seals against loss of fluid from the joint 40 between the first fluid conduit 28 and the second fluid conduit 34, although there is some leakage through this seal 42.

The rotary fluid coupler 20 further includes a return fluid conduit 44 having an inlet end 46 overlying and in fluid communication with the downstream (low-pressure) side of the first fluid conduit/second fluid conduit seal 42. Specifically, the inlet end 46 receives the leakage through the first fluid conduit/second fluid conduit seal 42. The return fluid conduit 44 is illustrated as annular in form and overlying and concentric with the first fluid conduit 34, and in this case the housing 29 in which the first fluid conduit 34 is formed. The inlet end 46 is preferably annular in form. The inlet end 46 is positioned to capture any fluid which leaks through the first fluid conduit/second fluid conduit seal 42 from the interior of the first fluid conduit 28 and/or the second fluid conduit 34 in the region of the joint 40. A return/joint seal 48 forms a seal between the inlet end 46 of the return fluid conduit 44 and at least one of the first fluid conduit 28 and the second fluid conduit 34. Here, the return/joint seal 48 is illustrated as formed between the inlet end 46 and an exterior surface of the second fluid conduit 34. The return/joint seal 48 seals against loss of fluid from the return fluid conduit 44 to the external environment. The return/joint seal 48 preferably comprises at least one O-ring seal.

A fluid-pressure biasing source, here illustrated as a vacuum source 50, is in communication with an outlet end 52 of the return fluid conduit 44. The vacuum source 50, which is preferably a vacuum pump in this embodiment, moves fluid in a direction away from the inlet end 46 through the return fluid conduit 44. The fluid which is drawn through the return fluid conduit 44 flows into a fluid reservoir 54, which may have an optional source conduit 56 to conduct the captured fluid back to the fluid source 22.

As the second fluid conduit 34 rotates relative to the first fluid conduit 28 about the axis of rotation 26 with fluid flowing in the conduits 28 and 34, there is inevitably some fluid leakage through the first fluid conduit/second fluid conduit seal 42. Any such leakage is received into the inlet end 46 of the return fluid conduit 44 and conveyed through the return fluid conduit 44 to the vacuum source 50 and the fluid reservoir 54. Since the amount of fluid lost through the first fluid conduit/second fluid conduit seal 42 is relatively small and is removed to the vacuum source 50 immediately, there is virtually no such lost fluid to be leaked through the return/joint seal 48. The rotary fluid coupler 20 is therefore essentially a closed system wherein all fluid is retained within the system.

Figure 2:
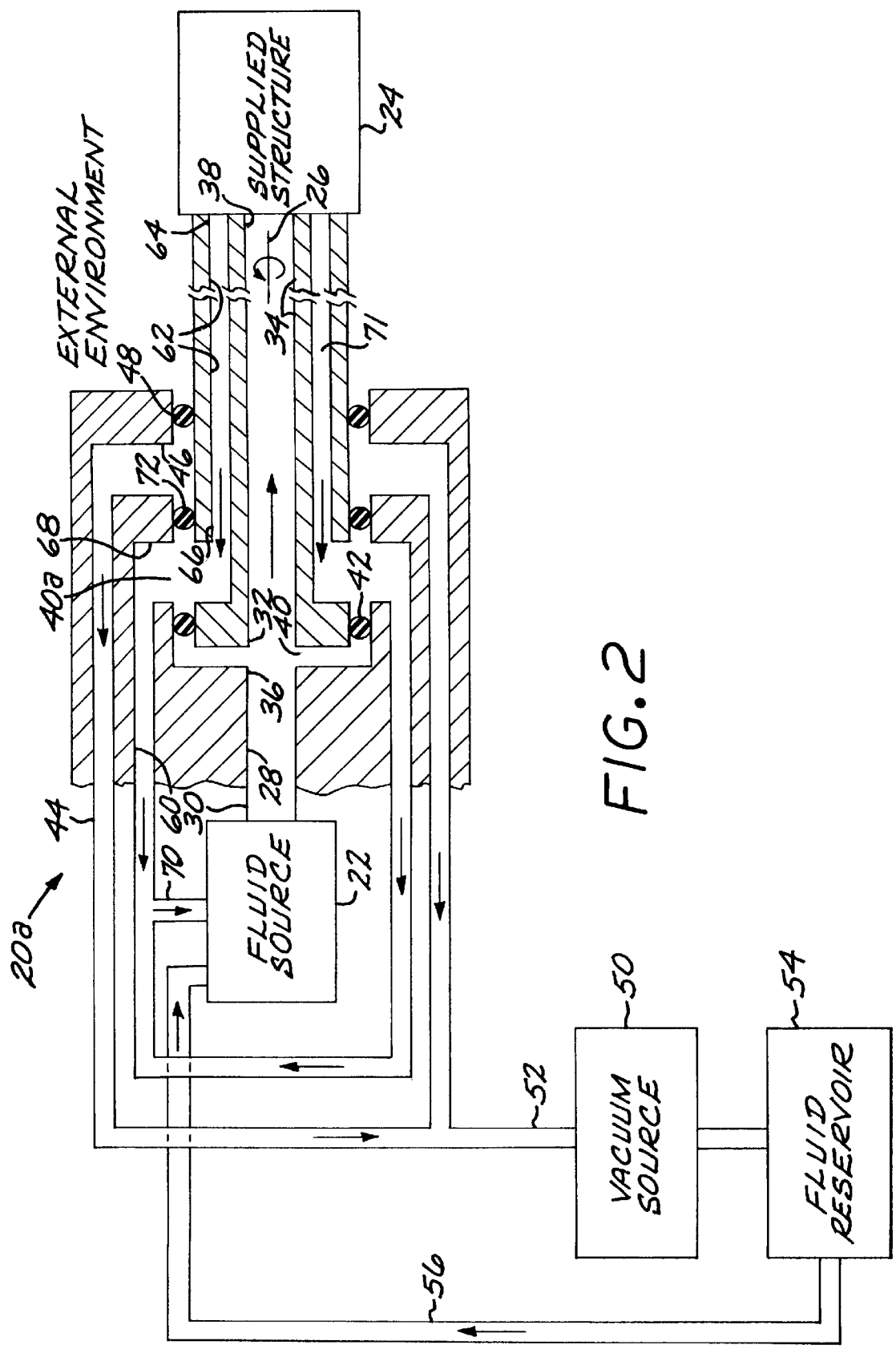
FIG. 2 is a schematic sectional view of a second embodiment of a rotary fluid coupler.

It is often the case that fluid must also be simultaneously conveyed from the supplied structure 24 back to the fluid source 22, and FIG. 2 illustrates a rotary fluid coupler 20a that accomplishes this purpose. The fluid conveyed from the supplied structure 24 back to the fluid source 22 is typically of the same chemical composition as the fluid conveyed from the fluid source 22 to the supplied structure 24, although it may be in a different physical state. For example, where a cryogenic fluid is supplied from the fluid source 22 to the supplied structure 24, it is desirable that any gas resulting from the evaporation of the cryogenic fluid be returned to the fluid source 22 to be condensed and reused. The gas is of the same composition as the liquid, and it is therefore permissible that they intermix in the rotary coupler 20a. The embodiment of FIG. 2 includes many of the same elements as in the embodiment of FIG. 1, and the same reference numerals have been used to describe those elements in FIG. 2. The prior description of these common elements is incorporated by reference. The embodiment of FIG. 2 includes additional conduits and seals to convey the fluid back from the supplied structure 24 to the fluid source 22.

The rotary fluid coupler 20b further includes a third fluid conduit 60 and a fourth fluid conduit 62 in fluid communication with the third fluid conduit 60. Fluid flows from the supplied structure into a first end 64 of the fourth fluid conduit 62, out of a second end 66 of the fourth fluid conduit 62, into a first end 68 of the third fluid conduit 60, and out of a second end 70 of the third fluid conduit 60. In the preferred application, the third fluid conduit 60 is a gas sink fluid conduit and the fourth fluid conduit 62 is a gas source fluid conduit. The second end 66 of the fourth fluid conduit 62 and the first end 68 of the third fluid conduit 60 meet at a second joint 40a, which is adjacent to the joint 40 in the rotary fluid coupler 20a. The fourth fluid conduit 62 overlies and is generally concentric with the second fluid conduit 34 so that fluid may flow in a fourth-fluid conduit annulus 71 between the outside wall of the second fluid conduit 34 and the inside wall of the fourth fluid conduit 62. The fourth fluid conduit 62 thus rotates with the second fluid conduit 34 about the axis of rotation 26.

A third fluid conduit/fourth fluid conduit seal 72 is located at the joint 40a between the third fluid conduit 60 and the fourth fluid conduit 62. The third fluid conduit/fourth fluid conduit seal 72 preferably comprises at least one O-ring seal. The third fluid conduit/fourth fluid conduit seal 72 forms a seal between the third fluid conduit 60 and the fourth fluid conduit 62, on the one hand, and the inlet end 46 of the return fluid conduit 44, on the other hand. The third fluid conduit/fourth fluid conduit seal 72 seals against leakage of fluid out of the second joint 40*a*. In operation, fluid flows from the supplied structure 24 through the fourth fluid conduit 62, through the third fluid conduit 60, and to the fluid source 22. From there, the fluid (after re-liquefaction, if necessary) flows back to the supplied structure 24 through the first fluid conduit 28 and the second fluid conduit 34.

In the embodiment of FIG. 2, there is inevitably some leakage from the joint 40 through the first fluid conduit/second fluid conduit seal 42. This leakage from the joint 40 is largely captured in the flow through the second joint 40*a* back to the fluid source 22. Any leakage from the joint 40*a* through the third fluid conduit/fourth fluid conduit seal 72 flows into the inlet end 46 of the return fluid conduit 44, flows to the vacuum source 50 and the fluid reservoir 54, and optionally flows back to the fluid source 22. The embodiment of FIG. 2 thus provides the rotary fluid conduit 20*b* for flowing fluid in both directions between the fluid source 22 and the supplied structure 24, without any substantial loss of fluid by leakage.

Figure 3:
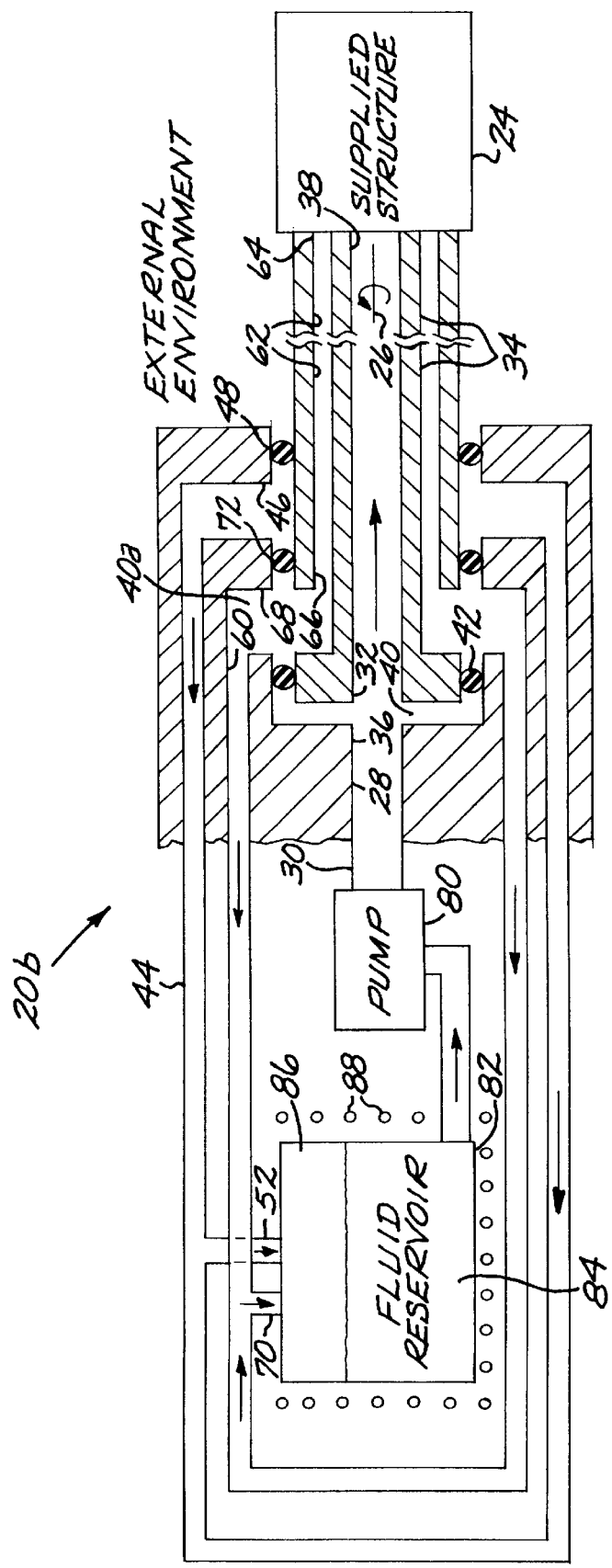
FIG. 3 is a schematic sectional view of a third embodiment of a rotary fluid coupler.

The rotary fluid coupler is operable with different pumping and fluid source arrangements, and FIG. 3 illustrates another embodiment of a rotary fluid coupler 20*b*. The rotary fluid coupler 20*b* of FIG. 3 has a coupler structure like that of the rotary fluid coupler 20*a* of FIG. 2, with a different source and pumping approach that may be operable in some, but not all, situations. The rotary fluid coupler 20*b* includes many of the same elements as in the embodiment of FIG. 2, and the same reference numerals have been used to describe those elements in FIG. 3. The prior description is incorporated by reference as to these elements.

In the rotary fluid coupler 20*b* of FIG. 3, the fluid is supplied to the first fluid conduit 28 by a pump 80, pumping on a fluid reservoir 82 containing liquid 84 with a gas space 86 above the liquid. The inlet end of the pump 80 is below the surface of the liquid 84. The fluid reservoir 82 is optionally cooled by a cooler 88, here depicted as a cooling coil, but which may be of any operable form. This cooling reduces the vapor pressure above the fluid surface of the fluid reservoir 82 to a near-vacuum level. This near-vacuum draws any potential leakage, that might otherwise occur through seal 48, through the return fluid conduit 44 to the fluid reservoir 82. The second end 70 of the third fluid conduit 60 communicates with the gas space 86, so that gas flows from the supplied structure 24, through the fourth fluid conduit 62 and the third fluid conduit 60, and into the gas space 86 of the fluid reservoir 82. As this gas condenses from the gaseous state to the liquid state due to the cooling of the cooler 88 and falls into the liquid 84, a partial vacuum is created in the gas space 86. The outlet end 52 of the return fluid conduit 44 also communicates with gas space 86. The partial vacuum, created as the gas flowing through the third fluid conduit 60 condenses in the gas space 86, serves to draw the gas in the return fluid conduit 44 into the gas space 86. The separate vacuum source 50 is therefore not required for this embodiment, reducing the power and weight requirements of the system while achieving the required performance.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A rotary fluid coupler, comprising:
   a first fluid conduit;
   a second fluid conduit in fluid communication with the first fluid conduit and rotatable relative to the first fluid conduit;
   a first fluid conduit/second fluid conduit seal at a joint between the first fluid conduit and the second fluid conduit, the first fluid conduit/second fluid conduit seal sealing against loss of fluid from the joint between the first fluid conduit and the second fluid conduit;
   a return fluid conduit having an inlet end disposed to receive fluid leaked through the first fluid conduct/second fluid conduit seal;
   a return/joint seal at the inlet end of the return fluid conduit, the return/joint seal sealing against loss of fluid from the inlet end of the return fluid conduit to an external environment; and
   a fluid-pressure biasing source in communication with the return fluid conduit to move fluid away from the inlet end through the return fluid conduit.

2. The rotary fluid coupler of claim 1, wherein the first fluid conduit is a liquid-source fluid conduit and the second fluid conduit is a liquid-sink fluid conduit.

3. The rotary fluid coupler of claim 1, wherein the first fluid conduit is stationary and the second fluid conduit is rotatable.

4. The rotary fluid coupler of claim 1, wherein the first fluid conduit/second fluid conduit seal comprises at least one O-ring seal.

5. The rotary fluid coupler of claim 1, wherein the return fluid conduit is concentric about the first fluid conduit so that fluid may flow in an return annulus therebetween.

6. The rotary fluid coupler of claim 1, wherein the return/joint seal comprises at least one O-ring seal.

7. The rotary fluid coupler of claim 1, wherein the biasing source comprises a vacuum source.

8. The rotary fluid coupler of claim 1, wherein the biasing source comprises a vacuum pump.

9. The rotary fluid coupler of claim 1, further including:
   a third fluid conduit,
   a fourth fluid conduit in fluid communication with the third fluid conduit and overlying the second fluid conduit so that fluid may flow in a fourth-fluid conduit annulus between the second fluid conduit and the fourth fluid conduit, and
   a third fluid conduit/fourth fluid conduit seal at a second joint between the third fluid conduit and the fourth fluid conduit, the third fluid conduit/fourth fluid conduit seal sealing against loss of fluid from the second joint to the return fluid conduit, and
   wherein the inlet end of the return fluid conduit is positioned to receive any fluid leaked through the third fluid conduit/fourth fluid conduit seal.

10. The rotary fluid coupler of claim 9, wherein the third fluid conduit is a gas sink fluid conduit and the fourth fluid conduit is a gas source fluid conduit.

11. The rotary fluid coupler of claim 9, wherein the biasing source comprises a mass of liquefied gas, and the third fluid conduit is in gaseous communication with a surface of the mass of liquefied gas.

12. A rotary fluid coupler, comprising:
    a first fluid conduit;

a second fluid conduit in fluid communication with the first fluid conduit and rotatable relative to the first fluid conduit about an axis of rotation;

a first fluid conduit/second fluid conduit seal at a joint between the first fluid conduit and the second fluid conduit;

a return fluid conduit having
an inlet end positioned to capture fluid leaked through the first fluid conduit/second fluid conduit seal, the inlet end of the return fluid conduit being annular and concentric with the axis of rotation, and
an outlet end;

a return/joint seal at the inlet end of the return fluid conduit, the return/joint seal sealing against loss of fluid from the return fluid conduit to an external environment; and a source of a vacuum in gaseous communication with the outlet end of the return fluid conduit to move fluid away from the inlet end thereof.

13. The rotary fluid coupler of claim 12, wherein the first fluid conduit/second fluid conduit seal comprises at least one O-ring seal.

14. The rotary fluid coupler of claim 12, wherein the return fluid conduit is concentric about the first fluid conduit so that fluid may flow in an return annulus therebetween.

15. The rotary fluid coupler of claim 12, wherein the return/joint seal comprises at least one O-ring seal.

16. The rotary fluid coupler of claim 12, wherein the biasing source comprises a vacuum source.

17. A rotary fluid coupler, comprising:

a first fluid conduit;

a second fluid conduit in fluid communication with the first fluid conduit and rotatable relative to the first fluid conduit about an axis of rotation;

a first fluid conduit/second fluid conduit seal at a joint between the first fluid conduit and the second fluid conduit, the first fluid/second fluid conduit seal sealing against loss of fluid from the joint between the first fluid conduit and the second fluid conduit;

a third fluid conduit overlying the first fluid conduit;

a fourth fluid conduit in fluid communication with the third fluid conduit and overlying the second fluid conduit, wherein fluid may flow in a fourth-fluid conduit annulus between the second fluid conduit and the fourth fluid conduit;

a third fluid conduit/fourth fluid conduit seal at a second joint between the third fluid conduit and the fourth fluid conduit, the third fluid conduit/fourth fluid conduit seal sealing against loss of fluid from the second joint;

a return fluid conduit having
an inlet end positioned to receive any fluid leaked through the third fluid conduit/fourth fluid conduit seal, the inlet end of the return fluid conduit being annular and concentric with the axis of rotation, and
an outlet end;

a return/joint seal at the inlet end of the return fluid conduit, the return/joint seal sealing against loss of fluid from the return fluid conduit to an external environment; and a source of a vacuum in gaseous communication with the outlet end of the return fluid conduit to move fluid away from the inlet end thereof.

18. The rotary fluid coupler of claim 17, wherein the first fluid conduit is a liquid-source fluid conduit, the second fluid conduit is a liquid-sink fluid conduit, the third fluid conduit is a gas sink fluid conduit, and the fourth fluid conduit is a gas source fluid conduit.

* * * * *